March 16, 1965  J. E. CAMPBELL  3,173,580
FLUID CONTAINERS

Filed Sept. 21, 1962  2 Sheets-Sheet 1

INVENTOR.
John E. Campbell
BY Brown and Mikulka

ATTORNEYS

March 16, 1965 J. E. CAMPBELL 3,173,580
FLUID CONTAINERS
Filed Sept. 21, 1962 2 Sheets-Sheet 2

INVENTOR.
John E. Campbell
BY Brown and Mikulka
ATTORNEYS

United States Patent Office 3,173,580
Patented Mar. 16, 1965

3,173,580
FLUID CONTAINERS
John E. Campbell, Needham, Mass., assignor to Polaroid
Corporation, Cambridge, Mass., a corporation of
Delaware
Filed Sept. 21, 1962, Ser. No. 225,265
6 Claims. (Cl. 222—107)

This invention relates to fluid containers and more particularly to fluid containers adapted to retain photographic processing compositions.

This application is a continuation-in-part of my copending application Serial No. 758,056, filed August 29, 1958 (now U.S. Patent No. 3,056,491, issued October 2, 1962).

United States Patents Nos. 2,543,181; 2,634,886; 2,653,-732; 2,674,532; 2,702,146; 2,723,051; and 2,750,075 disclose fluid containers adapted to retain photographic processing compositions and which are formed of a plurality of layers comprising, respectively, an outer layer of kraft paper, a layer of metal foil, and an inner liner or layer of a thermoplastic resin, preferably a polyvinyl acetal, especially polyvinyl butyral. In addition, it is disclosed that the aforesaid thermoplastic resins may be modified, as for example by the addition of appropriate plasticizers. A preferred polyvinyl butyral liner is disclosed as having admixed therewith dibutyl sebacate and nitrocellulose.

The containers of the prior art have been found to be subject to deterioration thereof by prolonged contact with caustic alkali and/or organic nitrogen-containing compounds, as for example, the cyclic imide and nitrogenous base silver halide complexing agents disclosed in U.S. Patent No. 2,857,274.

Objects of the present invention are to provide improved fluid containers, that is, improved containers of the aforesaid construction wherein the polyvinyl acetal inner coat or layer is replaced by an inner coat, liner or layer of polyvinyl chloride; substantially impervious to vapor; substantially impervious to alkali, especially to highly caustic liquid solutions; substantially impervious to nitrogen-containing compounds of the last-mentioned type; having pliable walls whereby said container is readily deformable; and having a sealed passage adjacent to at least one edge thereof which may be substantially uniformly unsealed throughout a predetermined length of said sealed passage upon application of stress to said container and wherein said walls are sealed by the differential application of heat without the use of an adhesive composition.

Further objects of the present invention comprise providing a continuous material from which individual blanks, adapted to form the aforementioned fluid containers, may be manufactured.

Another object of the present invention is to provide a liquid-carrying container so constructed that its contents may be directly and uniformly spread therefrom in a thin layer so as to fully cover an appreciably large area.

A further object of the present invention is to provide a liquid-carrying container of the above type, which is suitable for attachment to a material adapted either to carry or to otherwise serve in the formation of a positive photographic print.

Still another object of the present invention is to provide a liquid-carrying container of the above type suitable for positioning between sheet materials comprising a photosensitive film and a material for carrying a positive photographic print whereby said liquid may be released between said sheet materials and serve to form said print when the container is subject to compression.

Other objects of the present invention will in part be obvious and will in part appear hereinafter.

The invention accordingly comprises the products possessing the features, properties, and relation of components which are exemplified in the following detailed disclosure, and the scope of the application of which will be indicated in the claims.

For a fuller understanding of the nature and objects of the invention, reference should be had to the following detailed description taken in connection with the accompanying drawings wherein like reference characters refer to like parts throughout the several views and wherein.

Frequently it is required that a small quantity of liquid material be applied in a relatively thin layer over a fairly large surface area. For example, a photosensitive film may be processed or a picture may be toned by applying on the surface thereof, a layer of liquid containing the processing reagents, for example, a silver halide developing composition of the type disclosed in U.S. Patent No. 2,543,181, issued February 27, 1951 to Edwin H. Land, or toning agents in solution. Another example of the need for applying a thin liquid layer over a large surface area resides in the application of a dye or ink to a hand press or printing block for producing prints or impressions. Adhesion of two elements also often necessitates a continuous layer of an adhesive between surfaces of said elements. The present invention comprehends an inexpensive, preferably disposable, container adapted to provide for such uses a liquid which is in a quantity sufficient to carry out a single application to the respective surfaces of a sheet to be treated and which is in condition for direct application to said surfaces whereby to afford greater efficiency and economy of operation. Where desired, the aforementioned container may be directly affixed to or in apposition to a surface to be treated.

In one embodiment, the container is an elongated structure, having a length of at least twice its width, and is relatively flat, having a depth which is only a fraction of its width. The container is deformable in its filled and sealed condition so that it can be curved in the direction of its width, for example, about a radius equal to its width, without danger of rupturing its seal. A sealed passage extends the length of the container along one edge thereof and is the weakest of the edge seals which define the liquid-containing cavity and which confine the contents of said cavity.

The container should be fluid-tight, vapor-impervious and inert to its retained contents whereby the contents may be kept substantially unaffected by external agents, including the container itself, for an extended time interval.

The present invention is concerned with improved fluid containers of the aforementioned type which substantially avoid container degradation and fluid contamination resultant from the utilization of said containers to retain organic nitrogen-containing compounds and/or caustic alkali liquids such as highly caustic and/or organic nitrogen compounds containing photographic processing compositions.

In addition, the present invention is concerned with providing frangible containers of the aforementioned type which exhibit increased differential strength of the respective edge seals, thus facilitating substantially uniform rupture and distribution of the container's fluid contents by means of a predetermined passage orifice upon application of stress to said container's deformable surfaces.

Figure 1:
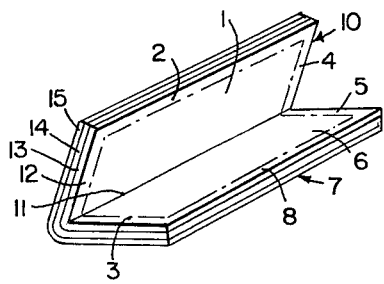
FIGURE 1 is a perspective view of one form of fluid container prior to introduction of a liquid thereinto and subsequent closure of the container walls.

The container is preferably formed from a single, essentially rectangular blank folded medially, as illustrated in FIGURE 1. The container is constructed of a multilayer, preferably medially folded, material comprising walls 7 and 10, said individual walls being formed by medial fold 11. A surface portion of one of said walls as, for example, portion 6 of wall 7, is suitable for receiving and in part confining said liquid, and a substantially equal surface portion of the other of said walls as, for example, surface portion 1 of wall 10 is suitable for further confining said fluid upon closure of said walls. The container may also be formed from two essentially rectangular blanks secured together at the marginal edges. It is so simply constructed that the container blank of FIG. 3, from which the container is formed, may be cut without waste from a continuous strip of sheet material, permitting the material of the container walls to be processed and the container to be filled, sealed and severed as part of one continuous operation.

Figure 2:
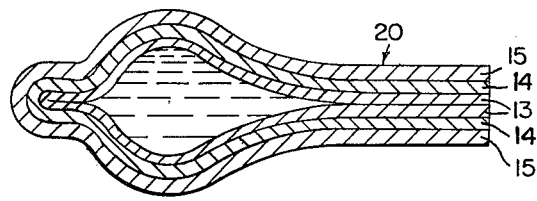
FIG. 2 is a cross-sectional view comprising the fluid container of FIGURE 1 after introduction of a liquid and closure of said container's walls.

The aforesaid fluid container is preferably constructed, as illustrated in FIG. 2, of an outer layer 15 as a backing or support layer, said outer layer 15 being preferably preformed of a thin, deformable, relatively inexpensive, tough material which may be a plastic but which is preferably a paper, such as a kraft paper. A thin film or sheet 14 of a relatively thin, impervious sheet material, such as a metal foil, for example, a sheet of lead, aluminum, etc., foil, approximating 0.001 inch in thickness and having dimensions predetermined according to the intended use is suitably adhered to a surface of a layer 15. A layer 13 comprising polyvinyl chloride is suitably adhered to the exposed surface of layer 14.

The polyvinyl chloride liner may be adhered to the metal foil layer by coating and/or laminating procedures well known to the art. Where a precast polyvinyl chloride liner is laminated to the metal foil, it is generally preferred to utilize an adhesive coating or layer interposed between the polyvinyl chloride and the metal foil layer, which adhesive layer is itself stable or stabilized against interaction with the container's fluid contents. There is, according to this method of lamination, thus afforded an additional layer enhancing the stability of the container and its retained liquids. Maximum-thickness laminating adhesive coats serve as an added barrier coating for retaining the container's liquid contents.

Figure 5:
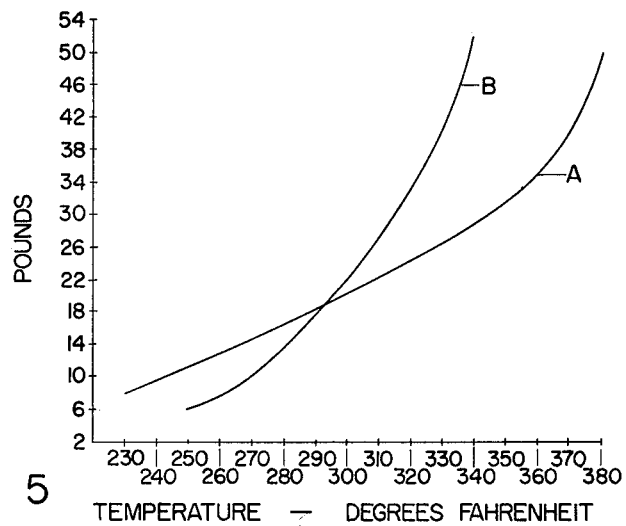
FIG. 5 is a graph showing the sealing characteristics of two polyvinyl chloride polymers as a function of temperature.
Figure 6:
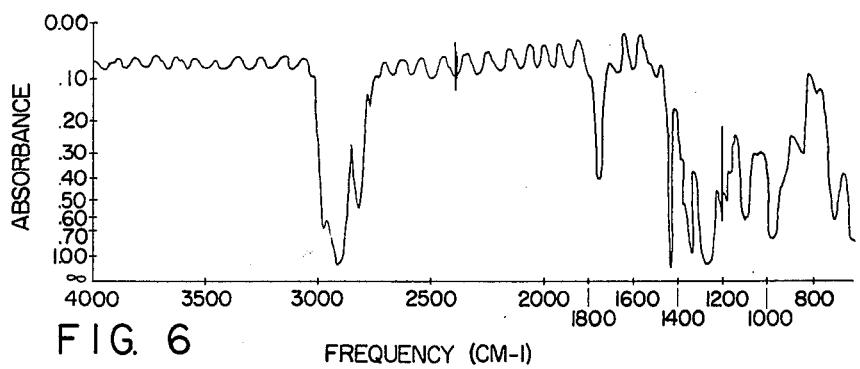
FIG. 6 is the infrared absorption spectrum of a polyvinyl chloride film which possesses the thermal characteristics suitable for use in this invention.
Figure 7:
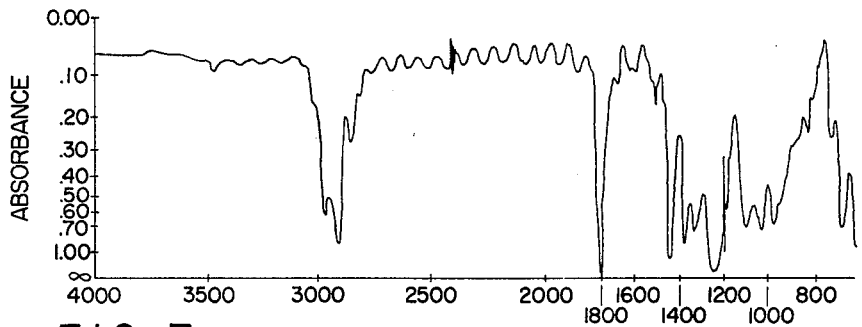
FIG. 7 is the infrared absorption spectrum of a polyvinyl chloride film which does not possess the thermal characteristics suitable for use in this invention.

The term "polyvinyl chloride," as used herein, is intended to signify a vinyl chloride polymer which possesses the necessary thermal characteristics whereby the desired degree of cohesive bonding strength and bond permanence can be applied to the respective marginal surface portions of the blank by the application of a differential heat input to said respective marginal surface portions. FIG. 5 shows the sealing characteristics of a vinyl chloride polymer suitable for use in this invention (line A) as compared with a vinyl chloride polymer which does not possess the properties necessary for use in this invention (line B). In FIG. 5, sealing temperature is plotted on the abscissa and, plotted on the ordinate, is the seal strength or bursting strength which indicates the weight in pounds necessary to rupture the front seal when said weight is applied to the fluid container filled with processing composition. It should be noted that for a container to be considered satisfactory the rupture must occur uniformly along the entire front edge, that is, the entire length of the seal; a break of less than the entire length of the seal is considered unsatisfactory. Polyvinyl chloride suitable for use in this invention comprises vinyl chloride polymer and 0 to 15%, preferably 2 to 5%, of a plasticizer, and preferably a polymeric plasticizer such as a polyester plasticizer. FIG. 6 shows the infrared absorption spectrum of such polymers and may be compared with the infrared absorption spectrum shown in FIG. 7 of a polyvinyl chloride which does not possess the properties necessary for use in this invention. As examples of polymers suitable for use in this invention, mention may be made of VYAB 6304 Film, polyvinyl chloride sold by Union Carbide Corporation, New York, N.Y., and Q4379.1 Vinyl, polyvinyl chloride sold by Dow Chemical Company, Midland, Michigan.

In the completed, closed, liquid-carrying container, the aforementioned polyvinyl chloride coating 13 serves both to substantially prevent direct contact of the carried fluid with the vapor-impervious layer 14 and as a means of bonding together the facing marginal portions of said polyvinyl chloride layer bordering the enclosed liquid by subjecting said marginal portions to an application of heat and pressure, said portion thus bonded providing means for sealing the liquid within the container.

Upon closure of walls 7 and 10, marginal surface portions 2, 4 and 12 come in contact with marginal surface portions 8, 5 and 3, respectively, and may be suitably bonded together and, when thus bonded, provide, in conjunction with fold 11, means for effecting a completely sealed enclosure or space.

The above-noted application Serial No. 758,056 discloses and claims fluid containers wherein the marginal portions of said containers are bonded together by means of adhesive compositions.

By means of this invention, the polyvinyl chloride marginal surface portions are bonded together without the application of an adhesive composition. Such direct adhesion of polyvinyl chloride can be achieved by the application of differential heat activation to the respective marginal surface portions to provide a front seal which will be opened in preference to the end seals upon the application of pressure, i.e., the front seal will be prone to fracture or separation upon the application of stress or pressure to the container, while the end seals will withstand such stress or pressure without opening, thereby obtaining directional release of the contained fluid.

Figure 3:
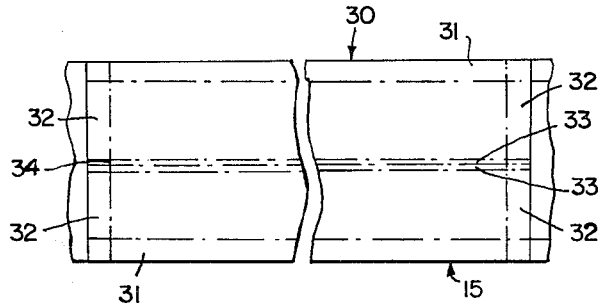
FIG. 3 is a fragmentary, plan view of the continuous material which is used in the formation of the container blanks of FIGURE 1.
Figure 4:
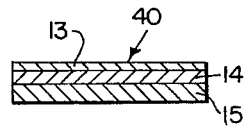
FIG. 4 is a cross-sectional view of the continuous material of FIG. 3.

Referring to FIG. 3, there is shown a blank 30 from which one embodiment of the novel container of the present invention may be formed; said blank 30, as shown, being substantially rectangular in shape and having a length equal to the container length, and a width approximately twice the width of the finished, filled container. As previously stated, the blank 30 is preferably formed of a composite, deformable sheet material comprising a plurality of strata, as illustrated in FIG. 4.

Outer layer 15 serves as the aforementioned backing or support layer which has applied thereto layer 14 which, as previously mentioned, is a thin film or sheet of a relatively vapor-impervious material, such as a metal foil. On the surface of said foil layer 14, a layer 13 of polyvinyl chloride comprising one or more strata is adhered to said foil layer 14 by the application of heat and/or pressure and/or an appropriate adhesive. Layers 13 and 14 are relatively thin, being only sufficiently thick to be continuous.

Referring again to FIGURE 1, such bonding of polyvinyl chloride to polyvinyl chloride without using an adhesive may be accomplished by varying the degree of thermal input to bond marginal surfaces 4 and 5 and 3 and 12 and that required to releasably bond marginal surfaces 2 and 8. Preferably, marginal surfaces 2 and 8, which when bonded form the front seal, are bonded at temperatures from 285 to 310° C., and at a pressure of 200 p.s.i., and marginal surfaces 4 and 5 and 3 and 12, which when bonded form the end seals, are bonded at temperatures from 360 to 400° C., and pressures ranging from 350–400 p.s.i. While the temperature at which bonding is achieved has been found to be critical, the pressure is not critical and may be varied over a wide range without adversely affecting the strength of the bond required. It may readily be seen, therefore, that by referring to FIG. 5, the desired seal strength may be achieved in a container by selecting the temperature for sealing corresponding to said desired seal strength.

Container 20, illustrated in FIG. 2, is formed by folding blank 30 along a substantially medial line 34 extending the length of the container and then securing together the faces of the marginal portions 32 along the short edges of the container and the facing marginal surface portions 31 along the long edge of the container. As previously mentioned, the several marginal portions are secured together by the application of heat and, in addition, it is preferable to adhesively secure together a narrow strip 33 of the container walls adjacent to the fold line 34. This provides a thin leading edge for the container over which a suitable pressure-applying device, such as a pressure roll or a doctor blade, may be readily advanced to compress the container walls and effect the release of the container contents by differential hydraulic rupture of the sealed marginal surfaces, preferably along the long edge of the container. The seals along the long edge and the short edges of the containers are effected between the marginal portions of the polyvinyl chloride layer by the differential application of heat to said marginal portions.

This structure assures a unidirectional release of the contents of the container upon application of the compressive squeezing force to the walls thereof. Such unidirectional release is accomplished by thermally providing a weaker front seal as compared with the other seals.

The fluid containers of this invention possess a number of advantages over containers which are sealed by means of an adhesive composition. Since it is not necessary to apply a layer of adhesive composition to the marginal surfaces of the blank there is one less step in the fabrication of the fluid containers. In fluid containers utilizing an adhesive strip, the strip of adhesive composition is extended all along the long edge, i.e., along marginal surface portion 8, to each corner of the front of the blank, thereby overlapping the more permanently sealed side seals, resulting in containers which have weak seals in the corners which may also rupture when the front seal opens. By means of the present invention, it is possible to take advantage of the ultimate potential of the polyvinyl chloride whereby the end seals can be made so strong that they can't be broken and, by the selection of the particular sealing heat range, the front seal can be made weaker, permitting unidirectional release of the fluid contained therein. Since bonding the polyvinyl chloride to itself provides a surer, more perfect and more reliable seal, a greater stability of the fluid composition is noted.

In the formation of the container, the contents may be introduced as the container walls are being sealed together. For example, the long edges of the container may be sealed together before the blank is severed from the stock of material from which it is formed. During the sealing together of the long edges, the desired quantity of liquid content for the container is introduced between the folded walls of the blank and thereafter the short edges are sealed together and the finished container severed from the remainder of the sheet stock. The sealing is effected by the differential application of heat to the facing marginal surfaces of polyvinyl chloride thereby bonding said marginal surfaces together.

In one preferred form of the container for spreading a liquid reagent to a thickness of approximately 0.003 inch over an area approximately three inches by four inches, a container 3½ inches long and having a maximum thickness of ⅛ of an inch can be used. The overall width of such container will be approximately ¾ of an inch and the width of the seals at the marginal areas will be approximately ⅜ of an inch, while the seal at the release edge of the container will be approximately ⅛ of an inch. The overall thickness of the sheet materials from which the container walls are formed may be approximately 0.0048 of an inch, with layer 15 approximately 0.0025 of an inch thick, layer 14 approximately 0.0014 of an inch thick, and layer 13 approximately 0.0009 of an inch thick.

The aforesaid materials and constructions provide a container capable of substantially confining a liquid as, for example, a liquid as, for example, a liquid adapted for processing a photographically exposed photosensitive film and, in conjunction therewith, said container effectively preventing loss of liquid content due to exudation, absorption, or evaporation thereof and acting to preserve said liquid substantially free from oxidation, it being understood that the liquid may be introduced into the container in an inert atmosphere.

The instant materials and constructions, to wit, frangible fluid containers comprising, respectively, an outer layer of kraft paper, a sheet of lead foil and an inner layer of polyvinyl chloride, said fluid container sealed by means of bonding the marginal edges of the polyvinyl chloride to itself and standards comprising representative prior art disclosed frangible fluid containers comprising, respectively, an outer layer of kraft paper, a sheet of lead foil and an inner layer of double coated polyvinyl butyral, having interposed between the long marginal edge thereof a strip comprising ethyl cellulose, were subjected to an accelerated aging test. The aging test comprised maintaining photographic processing composition retaining containers at a temperature of 190° F. for two weeks. This procedure disclosed severe deterioration of the standards' polyvinyl butyral layers in contradistinction to the instant containers which exhibited substantially no deterioration of their polyvinyl chloride layers.

The aforementioned experimental results are illustrative of the decreased fluid contamination and container deterioration afforded by the instant containers, especially decreased contamination and container deterioration caused by caustic liquids containing organic nitrogen compounds.

It will be understood that both the form and the capacity of the container and the dimensions and surfacing composition of the materials over which the liquid is to be spread are predetermined relative both to each other and to the compressive properties of pressure rollers or other suitable means for imparting compression.

It will be apparent that alternative forms of containers and arrangements thereof, with respect to a carrier material, may be provided within the scope of the invention. Said modifications may, for example, comprise a liquid-carrying portion of the container having either a greater or lesser traverse or longitudinal dimension than the container shown, or said modified container may have separable marginal surface portions for releasing the contained liquid which vary from the straight line linear portions illustrated.

Since certain changes may be made in the above products, it is intended that all matter contained in the above description or shown in the accompanying drawings shall be interpreted as illustrative and not in a limiting sense.

What is claimed is:

1. A rupturable single-use, fluid container having a pair of opposed walls secured together to provide a liquid retaining cavity, at least one of said walls being flexible and deformable, each of said walls comprising a plurality of layers, at least one of said layers being substantially vapor impervious, and the inner layer of each of said walls comprising a polymeric material containing a major portion of poylmerized vinyl chloride and 0 to 15% plasticizer, the marginal portions of said pair of opposed walls being adhered together by said polymeric material bonded to itself, wherein said bonding is achieved by the application of temperatures ranging from about 285–310° C. to the marginal portions of one edge and the application of temperatures ranging from about 360–410° C. to the remaining edges, whereby said container preferentially opens along said first-mentioned edge upon the application of pressure to said container.

2. A fluid container as defined in claim 1 wherein said substantially vapor-impervious layer comprises metal foil.

3. A fluid container as defined in claim 2 wherein said metal foil comprises lead foil.

4. A fluid container as defined in claim 2 wherein said metal foil comprises aluminum foil.

5. A fluid container as defined in claim 1 wherein said vinyl chloride polymer contains about 2 to 5% of a polymeric polyester plasticizer.

6. A fluid container as defined in claim 1 wherein a photographic processing composition is contained within said liquid-retaining cavity.

References Cited in the file of this patent

UNITED STATES PATENTS

| | | |
|---|---|---|
| 2,134,246 | Elger | Oct. 25, 1938 |
| 2,224,835 | Reichert | Dec. 10, 1940 |
| 2,504,417 | Hofrichter | Apr. 18, 1950 |
| 2,543,181 | Land | Feb. 27, 1951 |
| 2,603,565 | Land | July 15, 1952 |
| 2,634,886 | Land | Apr. 14, 1953 |
| 2,653,732 | Land | Sept. 29, 1953 |
| 2,702,146 | Land | Feb. 15, 1955 |
| 2,723,051 | McCune | Nov. 8, 1955 |
| 2,724,863 | Gudge et al. | Nov. 29, 1955 |
| 2,750,075 | Land et al. | June 12, 1956 |
| 2,861,718 | Winzen | Nov. 25, 1958 |
| 2,954,116 | Maso et al. | Sept. 27, 1960 |
| 2,958,169 | Flax | Nov. 1, 1960 |
| 3,012,386 | Pechmann et al. | Dec. 12, 1961 |

FOREIGN PATENTS

| | | |
|---|---|---|
| 788,536 | Great Britain | Jan. 2, 1958 |